Sept. 11, 1934.  M. MORRISON  1,973,010
TRANSFORMER APPARATUS
Original Filed Sept. 19, 1931
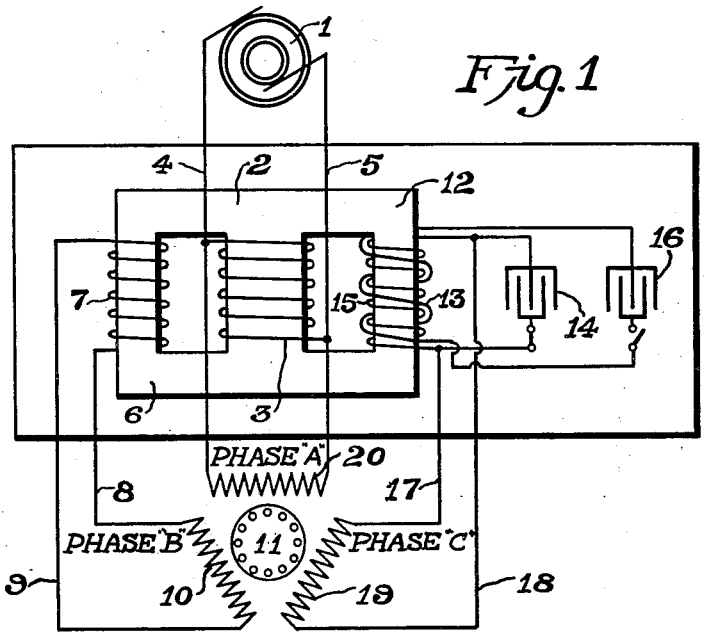
Fig.1
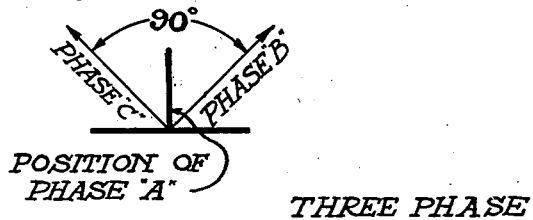
Fig.2  TWO PHASE - PHASE "A" NOT USED
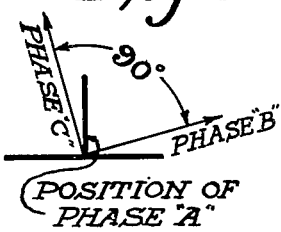
Fig.3
THREE PHASE
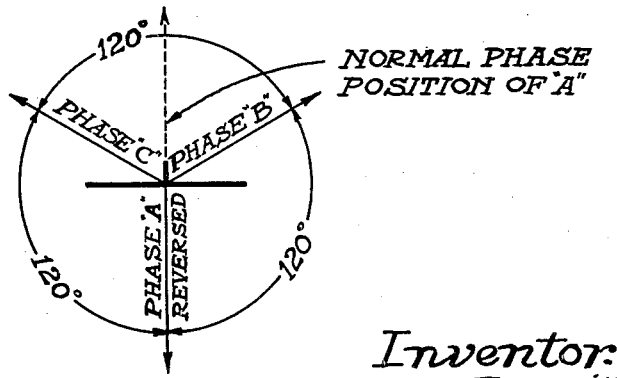
Fig.4
Inventor:
Montford Morrison Patented Sept. 11, 1934

1,973,010

UNITED STATES PATENT OFFICE 1,973,010

TRANSFORMER APPARATUS

Montford Morrison, Montclair, N. J.

Original application September 19, 1931, Serial No. 563,803. Divided and this application February 11, 1933, Serial No. 656,295

3 Claims. (Cl. 172—238)

This application is a division of my prior application, Serial No. 563,803, filed September 19, 1931, patented Feb. 6, 1934, No. 1,946,098, for improvements in Sound wave producing devices, which latter said application relates to ceratin specific uses of the present invention.

This invention relates to a class of devices involving the transformation of single phase current into polyphase currents.

Among the objects of this invention are to provide the production of polyphase currents from sources where only single phase current is available; and to provide a small compact and relatively inexpensive means of making this transformation and to further accomplish this result without the use of moving parts.

It is well known in the alternating current motor art that, under certain conditions, the apparatus efficiency of three phase rotating machines is much higher than that of single phase machines.

Further, there are other uses where small wattage capacity alternating polyphase currents may be used to particular economical advantage, one of which is disclosed in the parent application hereto.

It will be appreciated by those skilled in the art that this invention is not limited to the transformation from single phase to any particular number of phases but may be utilized for obtaining two, three or more phases. While only two and three phase applications are discussed herein and while only a three phase application is described in the specific embodiment, no such limitation is intended by the applicant. The specific embodiment described herein is intended to be only as a guide to teaching the invention and the scope thereof is best set forth in the claims hereto.

In the prior art, reactors, capacitors and resistors have been used to split a single phase current into a multiplicity of phases, but these methods have all involved a multiplicity of parts which greatly influence the manufacturing cost as well as do they detrimentally influence the electrical efficiency of the apparatus because of the duplication of magnetic circuits and the like.

While the present invention lends itself to be constructed entirely in one piece, however, due to the economic status of capacitors, in some cases I prefer not to combine all of the elements of my invention into one piece of apparatus.

Referring to the drawing, Fig. 1 represents one specific embodiment of the present invention and Figs. 2, 3 and 4 show vector diagrams illustrating typical circuit conditions in Fig. 1 under operation.

Many simple and different embodiments may be made of this invention and the one hereinafter described is selected for its suitability of teaching the invention rather than as being representative of a preferred embodiment.

In Fig. 1, 1 is a source of single phase alternating current; 2 is the laminated core of a three legged transformer having a primary 3 wound upon the central leg thereof. Alternating current source 1 feeds primary 3 through leads 4 and 5. One outer leg 6 is supplied with a secondary winding 7 and said secondary winding, through leads 8 and 9, supplies current to a load 10, which comprises one phase of a three-phase translating device 11, which, as shown in the figure, is a three phase alternating current squirrel cage motor.

The outer leg 12 of transformer 2 is supplied with a tertiary winding which may be constructed in any one of several ways. In general, the construction of this tertiary winding will depend upon the voltage desired for the applied load and will further depend on whether it is desired to make the device into one integral part or divide it into two or more elements.

I have discovered that very small, very high voltage transformers manifest a characteristic, familiarity with which is useful in connection with the understanding of one way to construct the tertiary coil used in the herein described embodiment of the present invention. Certain very small, very high voltage transformers, when provided with exciting current through their low voltage winding, will show increasing primary exciting current values for increased applied voltage up to a certain value. With some additional increase of voltage no increase of exciting current will be observed, then, with certain additional increase of applied voltage the exciting current will begin to decrease and may even go down to a very small percentage of the maximum value attained, and, depending upon core design and the constants of the secondary winding, may then make a very abrupt increase in exciting current for further increases of applied voltage. If the high voltage coils are removed from the core of the transformer and the above described test repeated, it will be found that the transformer will then have an ever increasing value of exciting current for increased values of applied voltage.

An analysis of the cause of this phenomenon will be found to be the distributed capacitance mainly between the layers of wire in the high voltage coil. This means that, under certain conditions, a very high voltage coil on a very small transformer acts identically in the same manner that a lower voltage coil acts with an external condenser.

In the embodiment there is illustrated a tertiary coil 13 which is loaded by a condenser 14. Further, the additional winding 15 may be shunted by an additional condenser 16.

It will be appreciated by those skilled in the art that either winding 13 or 15, or both, may be made to function in the identical same manner without condensers 14 or 16 if the distributed capacity of either one or both of the said coils produces the desired capacitance, due to the phenomenon above described.

From the above standpoint it will be appreciated by those skilled in the art that should the tertiary coil 13, or the addition of a floating winding 15, or both, have sufficient distributed capacitance to be equivalent to the external capacitors, the external capacitors will not be necessary and the embodiment will comprise a strictly integral element when it functions as hereinafter described. However, under the present economic status of small capacitors, higher apparatus efficiency is obtained by the use of external capacitance.

Coil 13 is further connected by leads 17 and 18 to load 19 of translating device 11. Also, leads 5 and 6 are further connected to load 20 of translating device 11. While this described structure is primarily a three phase embodiment of the invention, it will be obvious and further herein pointed out how, by proper adjustment of the device, two or one-quarter phase currents may be obtained.

The operation of the disclosed embodiment is as follows: Phase A of translating device 11 may be supplied directly from alternating current source 1. The secondary coil 7, being somewhat remotely disposed from primary coil 13, provides any desired amount of reactance for the circuit of phase B so that the voltage of cross load 10 may be fixed at any desired relative phase position with reference to phase A merely by properly determining the required leakage reactance of the transformer because of the fact that, in so far as the load circuit of a transformer is concerned, the internal reactance of the transformer acts exactly in the same resultant manner as series reactance in the external circuit; so that the voltage across the secondary coil 7 will lag the primary applied voltage in a time phase position determined by the internal reactance of the transformer and the secondary load.

Referring to Fig. 4, the normal phase of A is indicated by the dotted lines and the lagging of phase B is illustrated as 60 degrees, which is all that is necessary in this embodiment. Phase A is, in effect, reversed at the load, as indicated in the diagram, by properly reversing the connections thereto, making the working phase difference between A and B, 120 electrical degrees.

The operation of phase C can be best understood upon reference to the fact that in so far as the phase relations of the several elements of an alternating current circuit are concerned, it is immaterial, as already referred to, whether the capacitance of the circuit is a part of the windings or lumped externally thereof. Therefore, the voltage across capacitor 14 will depend upon the ratio of the capacitance of this element to the leakage reactance of the transformer and this may be further influenced if and when indicated as desirable because of apparatus economy by a capacitor 16 in electrical cooperation with coil 15.

Assuming that the capacitor 16 and the coil 15 are not necessary to the present operating conditions, the voltage across capacitor 14 may be made to lag practically any desirable amount by properly proportioning the capacitance to the reactance of the circuit where the load 19 is not the predominating current-limiting characteristic of the circuit. In the present invention, sufficient magnetic leakage is provided in coil 13 and sufficient capacitance is proved in capacitor 14 to overcompensate for the effect of the reactance of coil 13 and force the voltage of the load 19 to lead the normal phase position of A by 60 electrical degrees, as illustrated in Fig. 4.

It is a necessary element of the invention that sufficient reactance be supplied phase C to allow the capacitor 14 to influence the phase angle of the circuit sufficiently to attain the desired result.

The compactness of the design and increased apparatus efficiency is made possible by combining the magnetic circuits in a novel and condensed manner, and the overall cost of the apparatus is reduced by not only the double use of the magnetic circuits employed but also by the fewer number of parts to be fabricated and handled.

It is very difficult, and, further, involves a structure producing a very low state of apparatus efficiency, to produce in an alternating current circuit a load voltage lagged 90 degrees, which is that required to produce two or quarter phased currents from single phase current.

It will be appreciated from the disclosure herein that it is not necessary to lag the voltage of A to anything approaching the magnitude of 90 electrical degrees to produce quarter phase currents and, hence, the production of quarter phase currents from single phase current becomes a rather simple and easy matter as compared to prior art attempts to approach such extreme degrees of lagging. This is brought about by the fact that even if 90 degrees phase difference is desired between two phases in an embodiment of the present invention, one of the phases used may be made to lead the input voltage so that the angle difference between the led voltage and the lagged voltage may be selected to produce the best apparatus economy.

Referring to the operation of the invention and, in particular, to Fig. 4, it will be appreciated that if phase B is lagged such that the phase C is shifted only sufficiently to produce 90 degrees between them, these two phases may be then utilized for two or one-quarter phase operation. The relative phase positions between these two phases and primary phase may be anything convenient or desired, as indicated in Figs. 2 and 3.

In Fig. 2, phases B and C are shifted equal amounts from the normal position of A but, in some cases, further apparatus economy may be effected by shifting B a greater amount and C a lesser amount, as shown in Fig. 3, or vice versa.

I claim:

1. A single phase excited transformer apparatus comprising a laminated core of magnetic material having three legs with interconnecting yokes, a single phase primary winding surrounding one of said legs, a secondary winding surrounding one of the remaining said legs and connected to one phase of a polyphase translating device, a tertiary winding surrounding the remaining leg thereof, connected to a second phase of the said translating device and effectively loaded by a capacitor.

2. A single core shell type induction apparatus comprising a material of high permeability having two magnetic circuits, one portion of one of said circuits being common with one portion of the other of said circuits, said apparatus provided with complete primary excitation by means of a single primary winding, means inductively associated with one of said magnetic circuits for causing the flux in a portion of this said circuit to lag in phase time relation behind the primary magnetic exciting field and means inductively associated with the other of the said magnetic circuits for causing the flux in a portion of that said circuit to lead in phase time relation with the primary magnetic exciting field.

3. A transformer apparatus comprising a laminated core of magnetic material having three legs with inter-connecting yokes, a single phase primary winding surrounding one of said legs, a secondary winding surrounding one of the remaining said legs and connected to one phase of a polyphase translating device, a tertiary winding surrounding the remaining leg thereof, connected to a second phase of the said translating device and effectively loaded by a capacitor.

MONTFORD MORRISON.